Feb. 25, 1958  H. G. FITZGERALD  2,824,490
APPARATUS FOR PRESENTING MARKET QUOTATIONS
BY OPTICAL PROJECTION MEANS
Filed Feb. 28, 1955  2 Sheets-Sheet 1
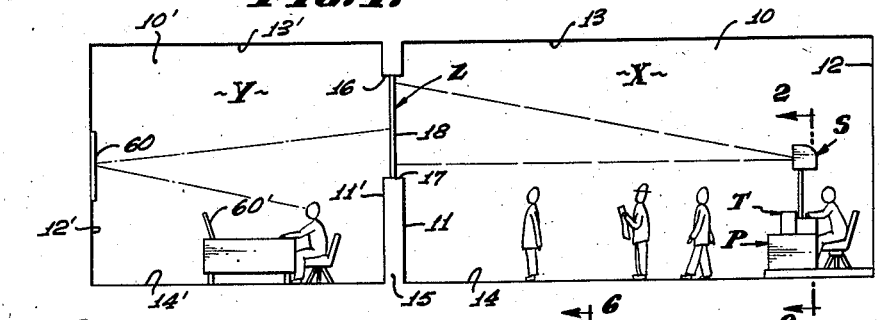
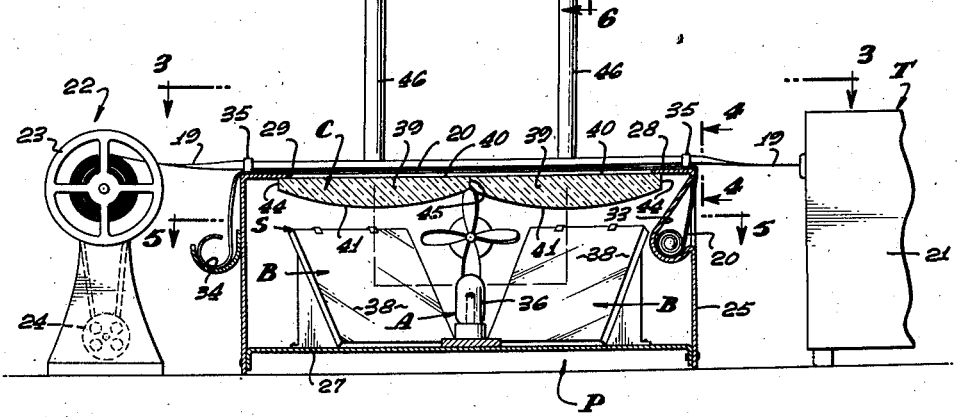
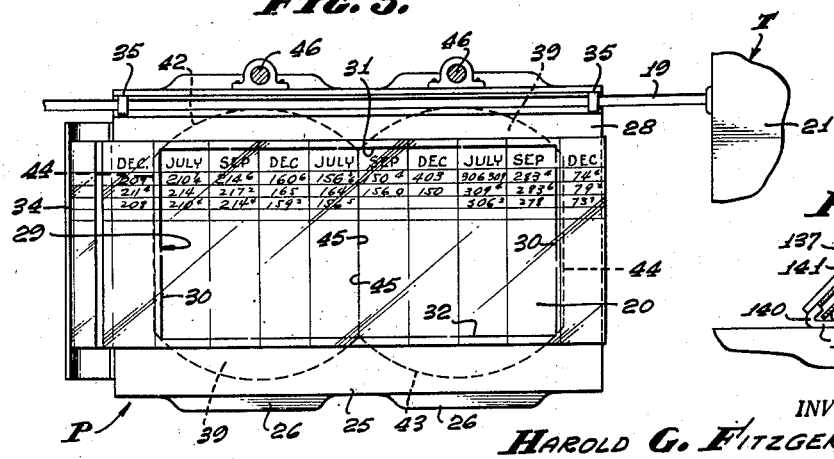
INVENTOR.
HAROLD G. FITZGERALD
BY
AGENT.

Feb. 25, 1958     H. G. FITZGERALD     2,824,490
APPARATUS FOR PRESENTING MARKET QUOTATIONS
BY OPTICAL PROJECTION MEANS
Filed Feb. 28, 1955     2 Sheets-Sheet 2
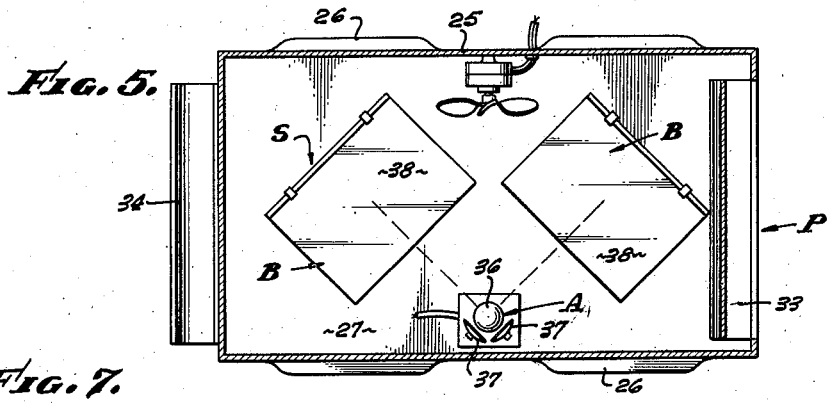
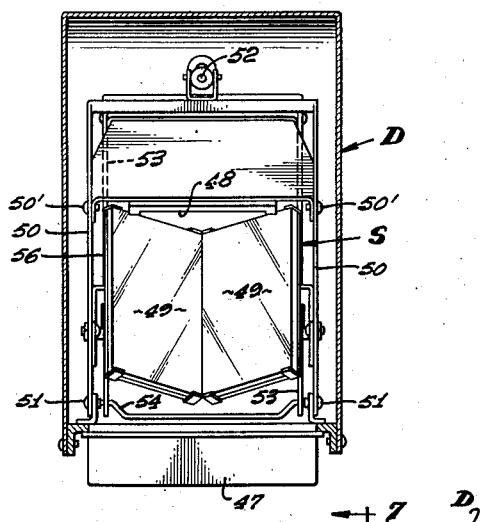
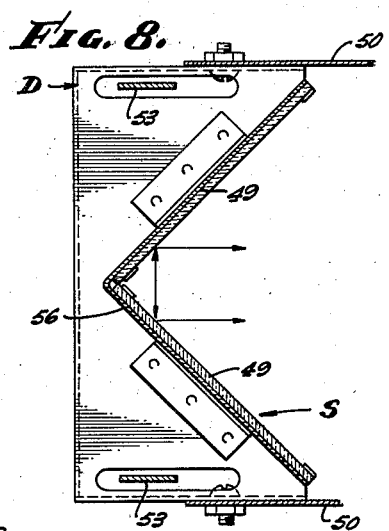
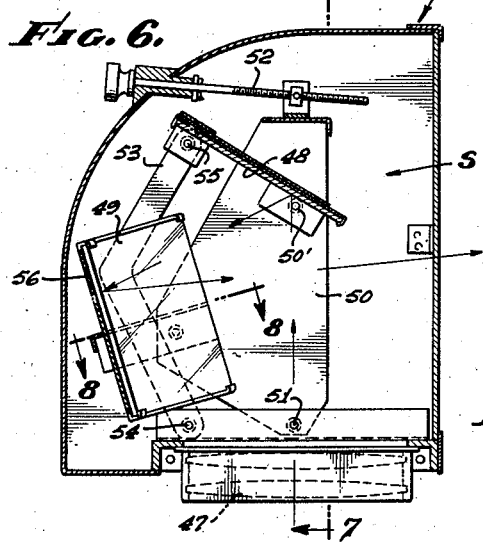
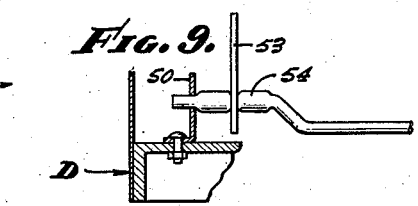
INVENTOR.
HAROLD G. FITZGERALD
BY
AGENT.

United States Patent Office 2,824,490
Patented Feb. 25, 1958

2,824,490

APPARATUS FOR PRESENTING MARKET QUOTATIONS BY OPTICAL PROJECTION MEANS

Harold G. Fitzgerald, Los Angeles, Calif., assignor to Victorlite Industries, Inc., Los Angeles, Calif., a corporation of California Application February 28, 1955, Serial No. 490,947

4 Claims. (Cl. 88—24)

This invention has to do with a projection apparatus for presenting market quotations and with a market quotation projecting apparatus, and is particularly concerned with an apparatus whereby current market data may be placed upon and removed from a stock exchange or brokerage house board by light projecting means so that customers, brokers and others may view the changing market in the main room of the concern, and so that the employees of the concern may view the changing market in a separate room.

In the business operation of a stock exchange or brokerage house, or the like, a large quotation board is ordinarily employed, which board is usually a chalk board upon which the quotations are written and erased by hand. Such boards are expensive and require attendants for their operation and maintenance, and in use they are rather slow to alter or change as the stock market fluctuates.

A general object of this inveniton is to provide apparatus for efficiently presenting market quotations upon a board by means of light projection.

An object of this invention is to provide light projecting apparatus for presenting stock market quotations upon a board in the form of a translucent screen whereby the quotations may be viewed directly in the main room of the brokerage house and whereby the market quotations can also be viewed in a separate room removed from the main room where the workers or employees of the brokerage house may carry on the necessary operations incidental to the business.

It is another object of this invention to provide a projecting apparatus adapted to handle a transparent film that may be written upon and from which the writings can be easily erased and altered, and that may be advanced in order to provide a clean section of film upon which to record new quotations as they are received by the person handling the apparatus.

A further object of this invention is to provide an apparatus of the character referred to which is easily and conveniently associated with a ticker tape and apparatus related thereto whereby a single person can record and alter or change the market quotations on the board or screen as they are presented by the ticker tape.

It is still another object of this invention to provide a projecting apparatus of the character set forth which is particularly adapted to project onto an elongate board or screen. In the present invention a plurality of lens systems is provided, supplied by a single light source, resulting in a structure of minimum size and adapted to handle or project onto a board or screen of great width.

It is still another object of this invention to provide a single light source for a projecting apparatus having a plurality of lens systems for projecting onto a single board or screen.

The various objects and features of my invention will be fully understood from the following detailed description of a typical preferred form and application of my invention, throughout which description reference is made to the accompanying drawings, in which:

Fig. 1 is a view of a typical apparatus embodying the features of the present invention and showing the main room and work room of a stock brokerage operation. Fig. 2 is an enlarged detailed view taken substantially as indicated by line 2—2 on Fig. 1 and showing the projecting apparatus with portions thereof in section. Fig. 3 is a plan view taken as indicated by line 3—3 on Fig. 2. Fig. 4 is an end view of a portion of the apparatus showing the guide for the tape. Fig. 5 is a sectional plan view taken as indicated by line 5—5 on Fig. 2. Fig. 6 is an enlarged detailed sectional view taken as indicated by line 6—6 on Fig. 2. Fig. 7 is a sectional view taken as indicated by line 7—7 on Fig. 6. Fig. 8 is an enlarged detailed sectional view of a portion of the structure taken as indicated by line 8—8 on Fig. 6, and Fig. 9 is an enlarged detailed view of a portion of the structure shown in Fig. 7.

The market quotation projecting apparatus that I have provided involves, generally, a main room X, a working room Y adjoining the main room, a quotation board Z positioned between the adjoining rooms X and Y, a quotation projector P adapted to throw an image onto the board Z, and a ticker tape unit T associated with the projector P.

The main room X is shown in Fig. 1 of the drawings and may be any suitable room such as an office or lobby, or the like, and has side walls 10, end walls 11 and 12, a ceiling 13 and a floor 14. In accordance with the carrying out of the type of business under consideration, the room X is of considerable size and is adapted to accommodate a substantial number of persons.

The working room Y is also shown in Fig. 1 of the drawings, and may be any suitable room such as an office, preferably an inner, and has side walls 10', end walls 11' and 12', a ceiling 13' and a floor 14'. As shown, the room X adjoins the room Y and is separated therefrom by a partition 15. In accordance with the business under consideration suitable desks and chairs, etc., are provided faced toward the wall 12' for the accommodation of employees and other personnel.

The quotation board Z, as shown in Fig. 1 of the drawings, is carried in the partition 15 that forms the walls 11 and 11'. An elongate horizontally disposed opening 16 is formed in the partition 15 to extend through the partition and open at both sides thereof at the walls 11 and 11'. The lower margin 17 of the opening 16 is spaced a substantial distance above the floors 14 and 14', say for example, about six feet or more in order to be above the persons occupying the rooms. In accordance with the present invention the quotation board Z is characterized by a translucent screen 18 adapted to receive projected light so that an image projected onto the screen 18 is visible from both the rooms X and Y.

The quotation projector P, as shown in Figs. 2 and 3 of the drawings, is adapted to project an elongate image onto the screen 18 and is adapted to receive and handle a tape 19, such as a ticker tape, so that the person handling the projector P can readily transpose information and data from the tape 19 to a transparent film 20 handled by the projector P. The projector P is preferably located adjacent or near the wall 12 and faces the screen 18 and involves, generally, a light source A, a plurality of projecting systems S, each system S including a reflector B, a condenser C and a projecting head D.

The ticker tape unit T is a standard item or equipment and involves a tape producing machine 21 adapted to receive signals from a remote source and to impress upon the tape 19 certain information and data concerning, in the case illustrated, the fluctuating stock market. The unit T also involves a take-up device 22 comprising a reel 23 and a motor drive 24 therefor, which produces suitable tension to draw the tape 19 over the projector P, as hereinafter described.

The projector P is provided with an elongate case or housing 25 having suitable vent openings 26, a bottom 27, and a flat horizontally disposed elongate top 28. The top 28 is in the focal plane of the projecting system S and is provided with an elongate opening or aperture 29 that extends longitudinally of the top 28. The aperture 29 is formed by ends 30 of, what I will term, limited vertical extent, and by top and bottom edges 31 and 32 of substantial length forming a rectangular opening of substantial width or length.

In addition to the elements thus far referred to, the projector P is provided with film handling means comprising a supply cavity 33 at one end of the housing 25 and a receiver 34 at the other end of the housing 25. The supply cavity 33 may be formed by providing a pocket in the end wall of the housing 25 adapted to receive a roll of film 20. The receiver 34 may be a simple rack at the exterior of the housing at the end opposite the cavity 33 adapted to receive the used film after it has passed over the top 28 of the projector.

The tape 19 issues from the machine 21 to feed across the top 28 of the projector P and extends longitudinally of the housing 25 adjacent the top edge 31 of the opening or aperture 29. A suitable guide 35 is provided at the top edge of the housing 25 to guide and direct the tape 19. As shown in Figs. 2, 3 and 4 of the drawings, the guide 35 is angularly related to the top of the housing to support the tape 19 so that the tape is pitched toward the operator of the machine. The guide 35 involves an elongate back 136 that extends longitudinally of the housing and which projects upwardly and outwardly therefrom, and retainers 137 at the ends of the back. The back 136 has a base 138 carried on the top of the housing and is secured in place by a clip 139 that overlies the base. The forward edge of the base 138 projects somewhat from the front of the guide 35 and has an upwardly turned lip 140 that guides the tape 19, and the retainers 137 are secured to the back 136 to project upwardly and are spaced from the plane of the back 136. A window element 141 of transparent material may be carried by the back 136 to extend between the retainer 137 and to occur at the front of the tape 19, as shown in Fig. 4 of the drawings. It will be apparent how the tape 19 is tilted or tipped to be more readily observed by the operator of the machine.

The film 20 issues from the cavity 33 at one end of the housing 25 and is periodically fed across the top 28 over the opening or aperture 29 and extends longitudinally of the housing 25 to issue from the other end thereof to be supported by the receiver 34. It is to be understood that a glass plate or any other suitable transparent part may be employed in place of the film 20.

The light source A that I have provided directs light in two directions, preferably 90° to each other, and is centrally located in the housing 25 adjacent one side wall thereof and involves a lamp 36 and spaced reflectors 37. The lamp 36 is mounted on a vertical axis and is supplied with electrical energy through suitable electric wiring under contact of a switch. The reflectors 37 are spaced radially from the lamp 36 and are faced to reflect light on horizontal axes. One reflector 37 is faced to reflect light diagonally across the interior of the housing 25 toward one end portion thereof while the other reflector 37 is faced to reflect light diagonally across the interior of the housing 25 toward the other end portion thereof.

The present invention involves a plurality of projecting systems S in order to increase the illumination of the screen 18 and when there are two reflectors 37 provided in connection with the light source A, there are two separate light projecting systems S. As shown, the light projecting systems are positioned adjacent each other and are adapted to project light vertically through the opening 29. Each system S is positioned to project light through one end portion of the opening 29 and on spaced parallel axes from each other.

Each projecting system S involves a reflector B which may be a suitable mirror or first surface reflector 38 located in one end portion of the housing 25. Each reflector 38 is mounted in a plane normal to the axis of the light received from the light source A, which light is projected diagonally and is angularly related to said plane to project light vertically through the opening 29.

Each projecting system S involves a condenser C which may be a suitable lens and is shown as a lens 39 of glass or the like, having a flat top face 40 and a convex bottom face 41. Each lens 39 is rectangular in plane configuration and occupies one-half of the opening 29 and has top and bottom sides 42 and 43 substantially coincidental with the edges 31 and 32, respectively, outer sides 44 substantially coincidental with the edges 30 and inner sides 45 which abut each other. It will be apparent from the foregoing and from Figs. 2 and 3 of the drawings, how the condenser lenses 39 occupy the complete opening or aperture 29.

Each projecting system S involves a projecting head D adapted to project an upright positive image when the person handling the machine faces the screen 18 and is applying data to the film 20. Each head D involves a support 46, a projecting lens 47 carried by the support, an adjustable projecting mirror 48 shiftably and pivotally carried by the support and a pair of adjustable reversing mirrors 49 shiftably carried by the support. The support 46 is a simple tubular part or the like, projecting upwardly at one side of the housing 25 preferably at the side remote from the person operating the projector. The projection lens may be any suitable lens having the proper focal length as circumstances require.

The adjustable projecting mirror 48 may be any suitable mirror, such as a first surface reflector, and is normally in a plane normal to the vertical axis of the light received through the opening or aperture 29 and is inclined to direct light downwardly and rearwardly to the reversing mirrors 49. The mirror 48 is pivotally carried on a shiftable bracket 50 by pins 50' and the bracket is pivotally carried at its lower end by pins 51 and is shifted by a screw-type operator 52. Suitable links 53 are pivotally connected to a fixed part of the head by a pivot member 54 and are pivotally secured to the mirror 48 by pins 55 so that when the bracket 50 is shifted through operation of the operator 52, the angular position of the mirror is altered whereby the image can be raised and lowered to properly focus upon the screen 18.

The adjustable reversing mirrors 49 are shown in Figs. 5, 6, and 7 of the drawings, and are carried in a frame 56 secured to the bracket 50 to be shiftable therewith. The pair of mirrors 49 is made up of angularly related mirrors in planes 90° to each other and pitched to receive light from the mirror 48 and to project the light forwardly and onto the screen 18.

In accordance with the method of the present invention it will be apparent from the foregoing that information or quotations may be transferred from the tape 19 to the transparency 20 in a single operation, which quotations and then cast upon the screen 18 by light projecting means. In practice the screen 18 is translucent so that the image cast thereon is visible from both sides thereof. With the method and apparatus the quotations may be presented by a single person and cast upon an enlarged screen so as to be immediately visible to persons in separate adjoining rooms.

From the foregoing it will be apparent that I have provided an extremely simple and effective apparatus for the projection of current data onto a screen which is not only visible to the operator of the machine, but to any and all persons within the room X. In addition, the image projected by the apparatus that I have provided is clearly visible in the adjoining room Y to persons in the said room who may easily view the screen 18 from the back side thereof at the wall 11' by simply viewing the screen 18 through a mirror 60. The mirror 60 is provided on the wall 12' of the room Y and may be of substantial size so that the entire screen 18 is visible. If desired, an individual mirror 60' may be provided at a person's desk.

Having described only a typical preferred form and application of my invention, I do not wish to be limited or restricted to the specific details herein set forth, but wish to reserve to myself any variations or modifications that may appear to those skilled in the art and fall within the scope of the followings claims:

Having described my invention, I claim:

1. In a quotation projection apparatus of the character described, a room with a quctation screen on one wall thereof, a quotation projector spaced from the wall and adapted to project an image on said screen and including, a housing with a flat horizontally disposed top having a projection aperture therethrough, a transparent film extending across the top of the housing and overlying the projection aperture, a light source in the housing, a light projecting system passing said light through the projection aperture and the film and onto the screen, a tape printing machine operatively associated with the projector, a tape carried by the tape printing machine for receiving printed quotations thereon, and means drivingly connected to the projector and conducting the said tape adjacent to and along one side of the projection aperture and the film so that quotations printed on the tape can be transposed onto the transparent film to be projected onto the screen.

2. In a quotation projecting apparatus of the character described, a room with an elongate horizontally disposed quotation screen on one wall thereof, a quotation projector spaced from the wall and adapted to project an image on said screen and including, an elongate housing having a flat horizontally disposed work supporting top with an elongate projection aperture therein, an elongate transparent film slidably carried by the work supporting top to extend longitudinally thereof and overlying the projection aperture a single light source in the housing, and a plurality of light reflecting systems each passing light through a portion of the projection aperture and the film and onto the screen, a tape printing machine associated with the projector, a tape carried by the tape printing machine for receiving printed quotations thereon, and a tape receiving guide fixed on the work supporting top of the housing adjacent the transparent film and the projection aperture and adapted to receive and guide the said tape across the work supporting top of the housing over the aperture so that quotations on the tape can be transposed onto the transparent film at the aperture to be projected onto the screen.

3. In a quotation projecting apparatus of the character described, a room with an elongate horizontally disposed translucent quotation screen on one wall thereof, a quotation projector spaced from the wall and adapted to project an image on said screen to be viewed from within the said room and including, a housing having a horizontally disposed top with an elongate projection aperture therethrough, a transparent film extending across the top of the housing and overlying the projection aperture a single light source in the housing, and a plurality of light reflecting systems each passing light through a portion of the projection aperture and onto the quotation screen, a second room adjoining the first mentioned room, there being a partition between the rooms with an opening therethrough and receiving said quotation screen, and a mirror on a wall of the last mentioned room opposite to the quotation screen for viewing the quotation screen and reversing the image thereon, a tape printing machine operatively associated with the quotation projector, a tape carried by the tape printing machine for receiving printed quotations thereon, and means carried by the quotation projector and conducting the said tape from the tape printing machine across the top of the projector housing adjacent the projection aperture and the transparent film so that printed quotations on the tape can be transposed onto the quotation film at the projection aperture to be projected onto the quotation screen.

4. In a quotation projecting apparatus of the character described, a room with a translucent elongate horizontally disposed quotation screen on one wall thereof, a quotation projector spaced from the said wall and adapted to project an image on said translucent screen to be viewed from within the said room and including, a housing having a flat horizontally disposed work supporting top with an elongate projection aperture therethrough, an elongate transparent film slidably carried by the work supporting top of the body and overlying the projection aperture, a single light source in the housing, and a pair of adjacent light reflecting systems each passing light through one end portion of the projection aperture and the transparent film and onto the translucent screen, a second room adjoining the first mentioned room, the said one wall of the first room being a partition between the first and second rooms with an opening therethrough and receiving said translucent screen, and a reflecting mirror on a wall of the second mentioned room opposite to the translucent screen for viewing the said screen and reversing the image projected onto and visible through the transparent screen, a tape printing machine associated with the projector, a tape carried by the tape printing machine for receiving printed quotations thereon, and a printed tape guide fixed to the work supporting top of the housing adjacent the projection aperture and adapted to guide the printed tape across the said top of the housing so that quotations printed on the projection tape can be transposed onto the projector at the aperture to be projected onto the screen by the projector and light reflecting systems.

References Cited in the file of this patent

UNITED STATES PATENTS

| Number | Name | Date |
| --- | --- | --- |
| 1,666,304 | Proctor | Apr. 17, 1928 |
| 1,945,522 | Eitzen | Feb. 6, 1934 |
| 2,004,103 | Eitzen | June 11, 1935 |
| 2,021,507 | Hanks | Nov. 19, 1935 |
| 2,050,317 | Hanks | Aug. 11, 1936 |
| 2,064,893 | Eitzen | Dec. 22, 1936 |
| 2,078,936 | Eitzen | May 4, 1937 |
| 2,107,290 | Eitzen | Feb. 8, 1938 |
| 2,310,273 | Bancroft | Feb. 9, 1943 |
| 2,330,799 | Coker et al. | Oct. 5, 1943 |

U. S. DEPARTMENT OF COMMERCE
PATENT OFFICE

CERTIFICATE OF CORRECTION

Patent No. 2,824,490                      February 25, 1958

Harold G. Fitzgerald

It is hereby certified that error appears in the printed specification of the above numbered patent requiring correction and that the said Letters Patent should read as corrected below.

Column 4, line 62, for "and then" read -- are then --; column 6, line 38, for "transparent" read -- translucent --.

Signed and sealed this 15th day of April 1958.

(SEAL)
Attest:
KARL H. AXLINE
Attesting Officer

ROBERT C. WATSON
Commissioner of Patents